United States Patent
Yamazaki et al.

(10) Patent No.: US 7,589,829 B2
(45) Date of Patent: Sep. 15, 2009

(54) LASER MEASURING SYSTEM

(75) Inventors: Takaaki Yamazaki, Itabashi-ku (JP); Yasutaka Katayama, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 12/069,226

(22) Filed: Feb. 8, 2008

(65) Prior Publication Data
US 2008/0218739 A1 Sep. 11, 2008

(30) Foreign Application Priority Data
Mar. 6, 2007 (JP) .............................. 2007-055976

(51) Int. Cl.
*G01N 21/00* (2006.01)

(52) U.S. Cl. ................. 356/72; 356/4.08; 356/141.4

(58) Field of Classification Search ............ 356/71–72, 356/147–148, 4.08, 3.09, 141.4; 250/234, 250/236; 172/4.5, 2, 4; 37/382; 33/290; 359/196–197
See application file for complete search history.

(56) References Cited

U.S. PATENT DOCUMENTS

| | | | | |
|---|---|---|---|---|
| 5,517,023 | A * | 5/1996 | Ohtomo et al. | 250/234 |
| 5,894,123 | A * | 4/1999 | Ohtomo et al. | 250/236 |
| 6,068,060 | A * | 5/2000 | Ohtomo et al. | 172/4.5 |
| 6,137,567 | A * | 10/2000 | Ohoka et al. | 356/147 |
| 6,163,373 | A * | 12/2000 | Ohtomo et al. | 356/147 |
| 6,172,742 | B1 * | 1/2001 | Yamazaki | 356/4.08 |
| 6,314,651 | B1 * | 11/2001 | Ohtomo et al. | 33/290 |
| 6,450,267 | B2 * | 9/2002 | Ohtomo et al. | 172/4.5 |
| 7,246,456 | B2 * | 7/2007 | Wray | 37/382 |

FOREIGN PATENT DOCUMENTS

| | | |
|---|---|---|
| JP | 11-166832 | 6/1999 |
| JP | 2000-356517 | 12/2000 |
| JP | 2006-214850 | 8/2006 |

* cited by examiner

*Primary Examiner*—Sang Nguyen
(74) *Attorney, Agent, or Firm*—Nields, Lemack & Frame, LLC

(57) ABSTRACT

A laser measuring system, which comprises a laser rotary irradiation device for forming a laser reference plane by projecting a laser beam in rotary irradiation, and a photodetection device for performing position measurement by receiving the laser beam, wherein the laser rotary irradiation device comprises a laser beam emitter, an emission light amount adjusting means for adjusting light amount of the laser beam of the laser beam emitter, and a first communication means for performing communication with said photodetection device, and wherein the photodetection device comprises a photodetector for detecting the reference plane, a second communication means for performing communication to and from the laser rotary irradiation device, and a control unit for calculating whether a photodetection signal from the photodetector is within a predetermined range or not, wherein the first communication means transmits a laser beam emitting condition of the laser rotary irradiation device to the second communication means, and the second communication means transmits a photodetecting condition of the photodetection device to the first communication means.

13 Claims, 9 Drawing Sheets

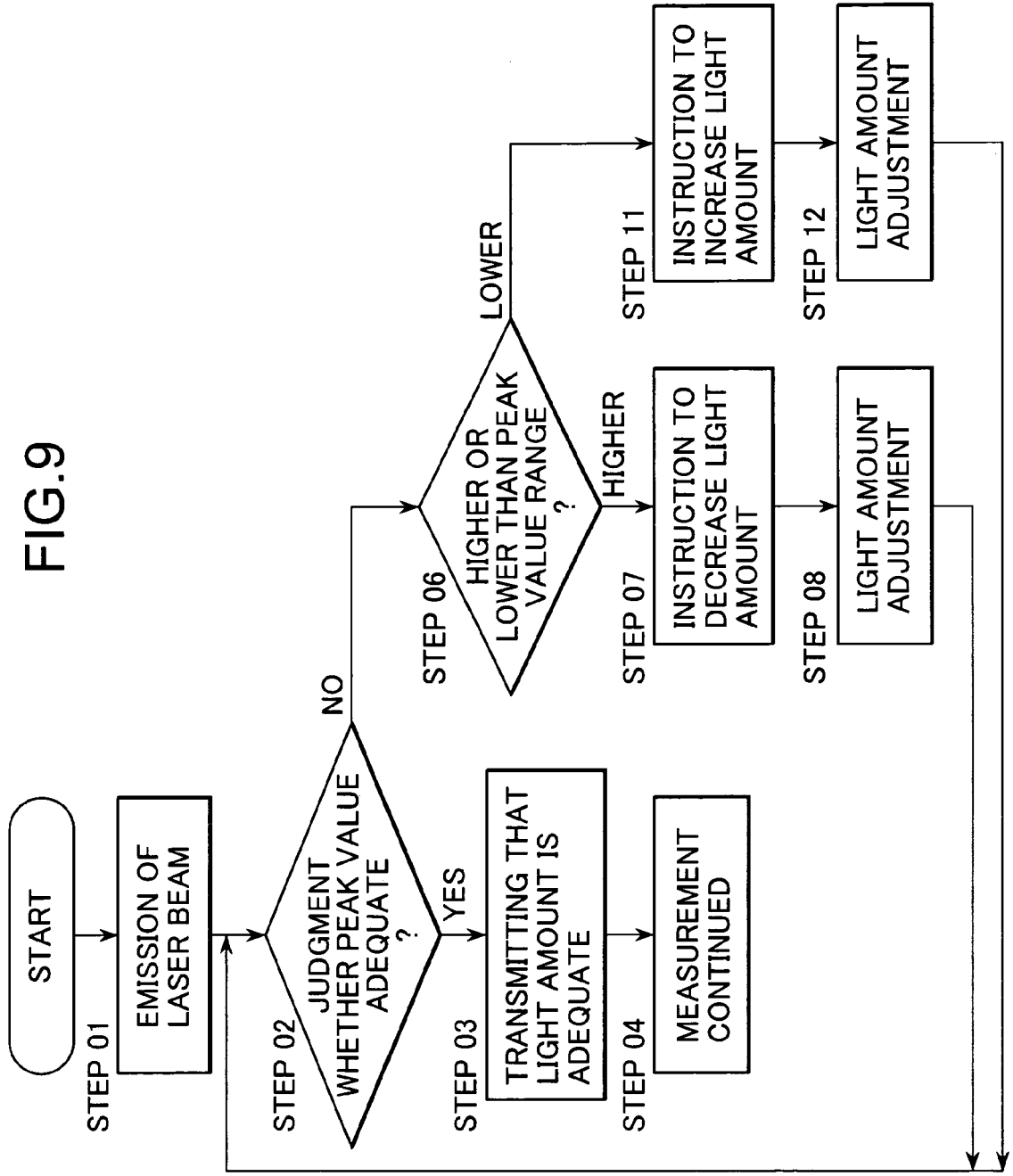

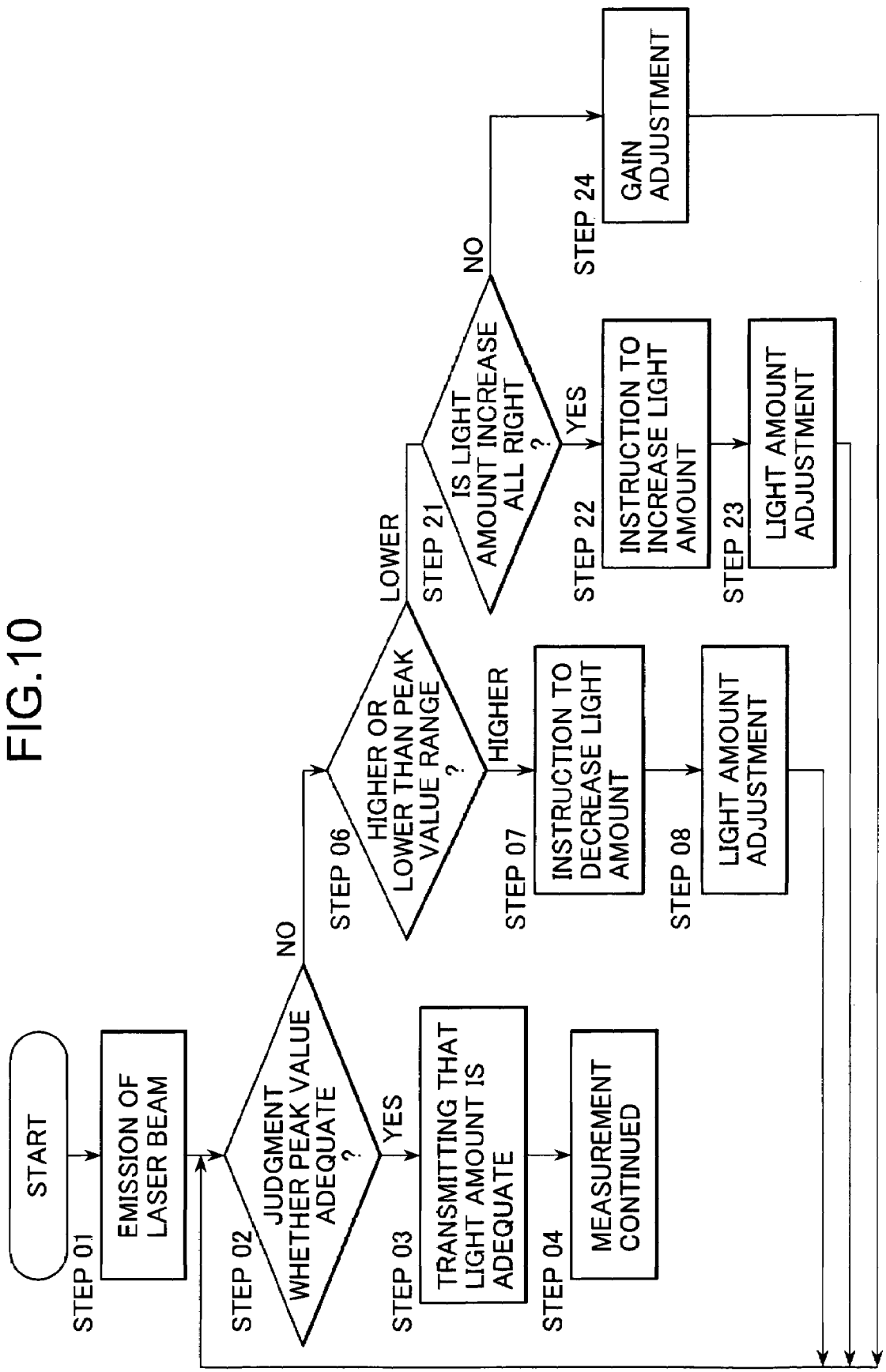

LASER MEASURING SYSTEM

BACKGROUND OF THE INVENTION

The present invention relates to a laser measuring system for forming a reference plane by projecting a laser beam in rotary irradiation from a laser rotary irradiation device, for receiving the laser beam by a photodetection device (light receiving device), and for measuring a position of operation or the like.

In the past, a laser rotary irradiation device has been known as a device for forming a reference plane to indicate a reference for operation in a wide range, and a photodetection device has been known as a device for receiving a laser beam and for measuring a position of the reference plane.

A laser rotary irradiation device forms a reference plane by projecting a laser beam with a spot-like luminous flux in rotary irradiation. For instance, by projecting the laser beam in rotary irradiation within a horizontal plane, a horizontal reference plane can be formed. When the laser beam is projected in rotary irradiation within a vertical plane, a vertical reference plane can be formed. When the laser beam is projected in rotary irradiation within a tilted plane, a tilted reference plane can be formed.

A photodetection device has a photodetector for receiving and detecting a laser beam. Based on the laser beam detected by the photodetector, a horizontal reference position, a vertical reference position, etc. can be measured. A laser measuring system can be made up by combining the laser rotary irradiation device and the photodetection device. The laser measuring system using the reference plane formed by the laser beam is used for from the operation in wide range including civil engineering work to the operation in relatively limited space such as room interior finishing work, for example.

In the laser measuring system as described above, the emission light amount of the laser beam of the laser rotary irradiation device is determined for each intended purpose. Usually, the emission light amount of the laser beam is set to a constant value depending on each type of the laser rotary irradiation device. On the other hand, in the case where the distance between the laser rotary irradiation device and the photodetection device is short, the light amount received by the photodetection device is high. In the case where the distance is long, the light amount is low. The photodetection light amount received at the photodetection device varies according to the distance between the laser rotary irradiation device and the photodetection device. The photodetection device has gain control function. Even when there is a change in the light amount of the received laser beam, the gain is adjusted so that the photodetection signal can be within the range of a predetermined level.

In the laser measuring system for performing the surveying operation in wider range, the emission light amount is set to a higher value so that the photodetection device can recognize that the laser beam has been received even when the distance between the laser rotary irradiation device and the photodetection device is long. In this respect, when the photodetection device receives the laser beam at a relatively short distance, the photodetection light amount is too high, and the photodetection light amount is often beyond the adjustment range of the gain control function of a photodetection signal amplifying circuit of the photodetection device. As a result, the photodetection signal reaches saturation.

When the laser measuring system is used in the operation at short distance, the laser measuring system is often so designed that the emission light amount of the laser beam can be manually changed by an operator in order to avoid the saturation of the photodetection signal.

Further, in actual case to use the laser measuring system, the laser rotary irradiation device is in operation at all times when the operation is going on. Moreover, the light amount of the laser beam is set in such manner that the light amount can match the operation at long distance. This means that the laser beam is projected with a higher light amount than it is required in the operation at short distance. This often leads to the waste in power consumption.

To solve the problems as described above, a laser rotary irradiation device has been proposed, in which the position where the photodetection device is installed is kept in memory and the laser beam is emitted only to a space closer to such position (JP-A-11-166832).

However, the laser rotary irradiation device as disclosed in JP-A-11-166832 is not sufficient for energy-saving purpose because the laser light amount is at a constant level. In case there are a plurality of operation points, substantial energy-saving effect cannot be attained.

Further, another type of laser rotary irradiation device has been proposed, in which the reflection light from the object projected by the laser beam is received and the light amount of the laser beam can be adjusted to an adequate value based on the photodetection light amount (JP-A-2006-214850).

However, according to the laser rotary irradiation device disclosed in JP-A-2006-214850, no photodetection device is provided. This means that the system can be applied only in the operation at a relatively short distance, and it is not suitable for the operation in civil engineering work or the like for wider range.

SUMMARY OF THE INVENTION

It is an object of the present invention to provide a laser measuring system, by which it is possible to perform measurement operation from a narrower operation range to a relatively wider operation range by using a single laser rotary irradiation device while maintaining the power consumption at low level.

To attain the above object, the present invention provides a laser measuring system, which comprises a laser rotary irradiation device for forming a laser reference plane by projecting a laser beam in rotary irradiation, and a photodetection device for performing position measurement by receiving the laser beam, wherein the laser rotary irradiation device comprises a laser beam emitter, an emission light amount adjusting means for adjusting light amount of the laser beam of the laser beam emitter, and a first communication means for performing communication with the photodetection device, and wherein the photodetection device comprises a photodetector for detecting the reference plane, a second communication means for performing communication to and from the laser rotary irradiation device, and a control unit for calculating whether a photodetection signal from the photodetector is within a predetermined range or not, wherein the first communication means transmits a laser beam emitting condition of the laser rotary irradiation device to the second communication means, and the second communication means transmits a photodetecting condition of the photodetection device to the first communication means.

Also, the present invention provides the laser measuring system as described above, wherein the control unit transmits the calculation result to the laser rotary irradiation device via the second communication means, the light amount adjusting means adjusts light amount of the laser beam based on the calculation result received so that the photodetection signal will be within a predetermined range. Further, the present invention provides the laser measuring system as described above, wherein the control unit adjusts amplifying condition of the photodetection signal from the photodetector based on the calculation result so that the photodetection signal will be within a predetermined range. Also, the present invention provides the laser measuring system as described above, wherein the control unit transmits the calculation result to the laser rotary irradiation device via the second communication means, the light amount adjusting means adjusts light amount of the laser beam based on the received calculation result, the control unit adjusts amplifying condition of the photodetection signal from the photodetector based on the calculation result, and the photodetection signal is turned to a predetermined range by adjusting the light amount and the amplifying condition. Further, the present invention provides the laser measuring system as described above, wherein the emission light amount adjusting means increases the emission light amount of the laser beam in the case the first communication means does not receive a signal to indicate photodetecting condition from the photodetection device for a first predetermined period of time. Also, the present invention provides the laser measuring system as described above, wherein the light amount adjusting means decreases the emission light amount of the laser beam in case the first communication means does not receive a signal to indicate the photodetecting condition from the photodetection device for a second predetermined period of time. Further, the present invention provides the laser measuring system as described above, wherein the photodetection device issues a signal to decrease the light amount to the laser rotary irradiation device, and the emission light amount adjusting means decreases the emission light amount of the laser beam, in the case the photodetector does not receive light for a second predetermined period of time. Also, the present invention provides the laser measuring system as described above, wherein the emission light amount adjusting means further increases the emission light amount of the laser beam temporarily after the elapse of a certain predetermined period of time from the time when the emission light of the laser beam has been decreased. Further, the present invention provides the laser measuring system as described above, wherein, in the case the photodetection device does not receive the light for a second predetermined period of time, it is judged that level measuring operation is in suspension status. Also, the present invention provides the laser measuring system as described above, wherein, in the case the photodetection device does not receive light for a third predetermined period of time longer than the second predetermined period of time, it is judged that level measuring operation has been terminated. Further, the present invention provides the laser measuring system as described above, wherein judgment of the suspension status is given by the laser rotary irradiation device. Also, the present invention provides the laser measuring system as described above, wherein judgment of the suspension status is given by the photodetection device. Further, the present invention provides the laser measuring system as described above, wherein judgment of termination of the operation is made by the laser rotary irradiation device. Also, the present invention provides the laser measuring system as described above, wherein judgment of termination of the operation is made by the photodetection device.

According to the present invention, there are provided a laser rotary irradiation device for forming a laser reference plane by projecting a laser beam in rotary irradiation, and a photodetection device for performing position measurement by receiving the laser beam, wherein the laser rotary irradiation device comprises a laser beam emitter, an emission light amount adjusting means for adjusting light amount of the laser beam of the laser beam emitter, and a first communication means for performing communication with the photodetection device, and wherein the photodetection device comprises a photodetector for detecting the reference plane, a second communication means for performing communication to and from the laser rotary irradiation device, and a control unit for calculating whether a photodetection signal from the photodetector is within a predetermined range or not, wherein the first communication means transmits a laser beam emitting condition of the laser rotary irradiation device to the second communication means, and the second communication means transmits a photodetecting condition of the photodetection device to the first communication means. As a result, the light amount of the laser beam can be adjusted to match the photodetecting condition.

Also, according to the present invention, the control unit transmits the calculation result to the laser rotary irradiation device via the second communication means, the light amount adjusting means adjusts light amount of the laser beam based on the calculation result received so that the photodetection signal will be within a predetermined range. This makes it possible to decrease the emission light amount at the photodetector and to decrease power consumption when the laser beam with the light amount higher than the necessary light amount is projected.

Further, according to the present invention, the control unit adjusts amplifying condition of the photodetection signal from the photodetector based on the calculation result so that the photodetection signal will be within a predetermined range. This makes it possible to decrease the emission light amount at the photodetector and to decrease power consumption when the laser beam with the light amount higher than the necessary light amount is projected.

Also, according to the present invention, the control unit transmits the calculation result to the laser rotary irradiation device via the second communication means, the light amount adjusting means adjusts light amount of the laser beam based on the received calculation result, the control unit adjusts amplifying condition of the photodetection signal from the photodetector based on the calculation result, and the photodetection signal is turned to a predetermined range by adjusting the light amount and the amplifying condition. This is helpful in realizing adequate photodetecting condition.

Further, according to the present invention, the emission light amount adjusting means increases the emission light amount of the laser beam in the case the first communication means does not receive a signal to indicate photodetecting condition from the photodetection device for a first predetermined period of time. As a result, the problem that the measurement cannot be performed due to insufficient light amount can be solved.

Also, according to the present invention, the light amount adjusting means decreases the emission light amount of the laser beam in the case the first communication means does not receive a signal to indicate the photodetecting condition from the photodetection device for a second predetermined period of time. This contributes to the prevention of the waste in power consumption caused by the operation of the laser rotary irradiation device during the suspension of operation or after the termination of operation.

Further, according to the present invention, the photodetection device issues a signal to decrease the light amount to the laser rotary irradiation device, and the emission light amount adjusting means decreases the emission light amount of the laser beam, in the case the photodetector does not receive light for a second predetermined period of time. This contributes to the prevention of the waste in power consumption caused by the operation of the laser rotary irradiation device during the suspension of operation or after the termination of operation.

Also, according to the present invention, the emission light amount adjusting means further increases the emission light amount of the laser beam temporarily after the elapse of a certain predetermined period of time from the time when the emission light of the laser beam has been decreased. Thus, in the case the photodetection signal from the photodetection device is not received due to the suspension of operation or the termination of operation or the other causes, the operation can be resumed by increasing the emission light amount while suppressing the power consumption to lower level.

BRIEF DESCRIPTION OF THE DRAWINGS

FIG. 9 is a flow chart of a second aspect of the invention; and

FIG. 10 is a flow chart of a third aspect of the invention.

DETAILED DESCRIPTION OF THE PREFERRED EMBODIMENT

Detailed description will be given below on the best mode for carrying out the invention by referring to the attached drawings.

Figure 1:
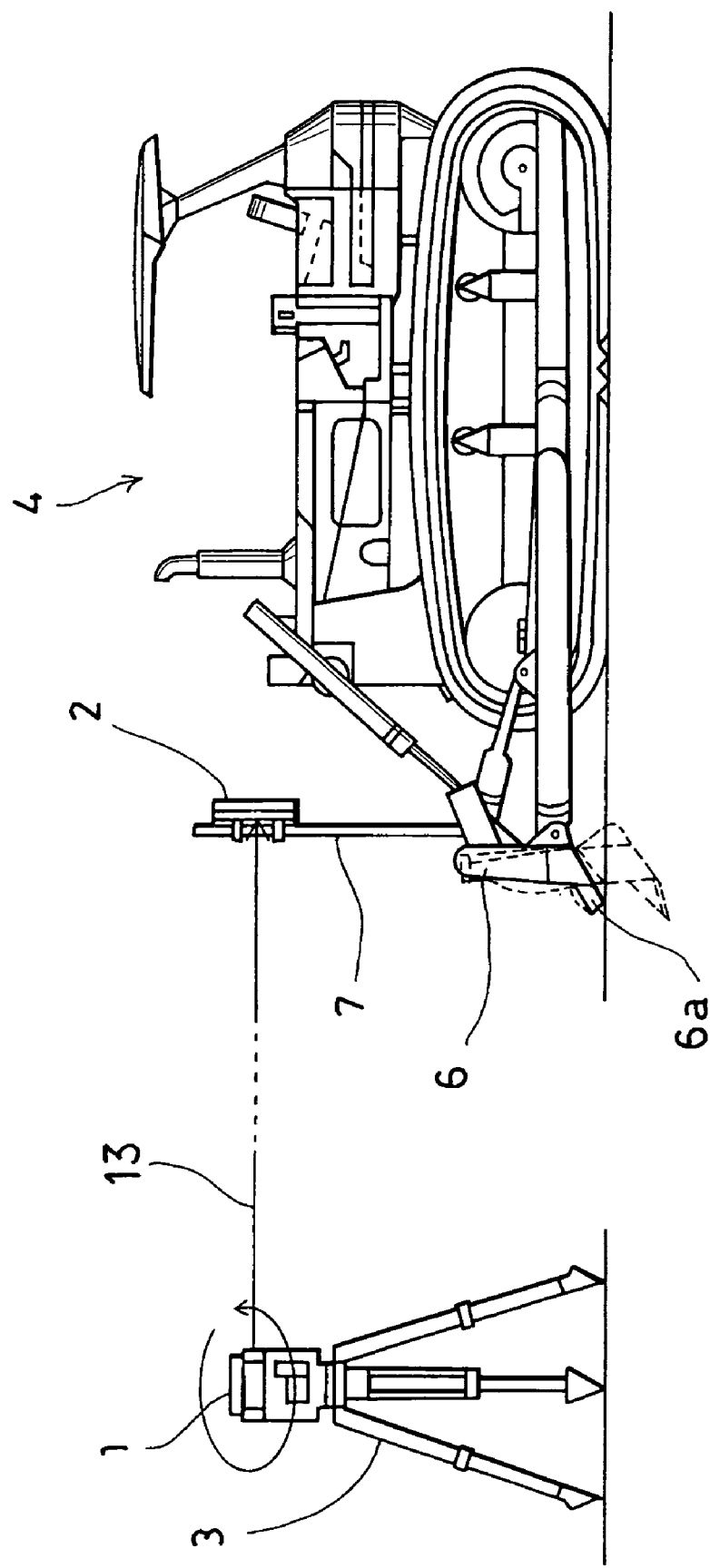
FIG. 1 is an overall view of an embodiment of the present invention.

FIG. 1 shows a case where the laser measuring system according to the present invention is applied in civil engineering work.

In FIG. 1, reference numeral 1 denotes a laser rotary irradiation device, and numeral 2 represents a photodetection device (a light receiving device).

The laser rotary irradiation device 1 is installed at a predetermined point, preferably at a known point, and at a known height via a tripod 3. The photodetection device 2 is mounted at a position as required on a construction machine 4 such as a bulldozer. More concretely, the photodetection device 2 is fixedly mounted on a mounting pole 7 erected on an operation tool, e.g. a blade 6, of the construction machine 4. In this case, it is assumed that a distance from a reference position for photodetection (light receiving) of the photodetection device 2 to the position of a blade edge 6a of the blade 6 is already known.

A laser beam 13 is projected by the laser rotary irradiation device 1 in rotary irradiation. The laser beam 13 is then detected by the photodetection device 2. In this case, the height of the blade 6 is controlled so that photodetecting position at the photodetection device 2 is maintained at a predetermined position, and ground-leveling operation can be carried out accurately as per the plane as planned.

Figure 2:
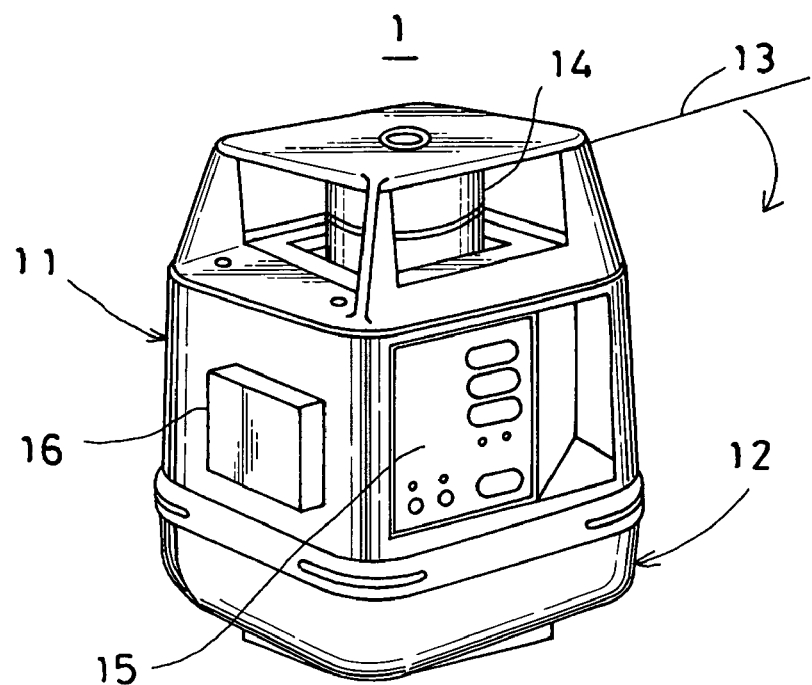
FIG. 2 is a perspective view of an example of a laser rotary irradiation device used in the present invention.

FIG. 2 shows an example of the laser rotary irradiation device 1, which comprises a main unit 11 for containing a laser beam emitter, a projection optical system, a rotary driving mechanism, a leveling unit, etc., a power source accommodating unit 12 for accommodating power source such as battery, and a rotator 14 for deflecting the direction of the laser beam 13 to a horizontal direction and projecting the laser beam 13 in rotary irradiation. The main unit 11 further comprises an operation unit 15 and a first communication unit 16 such as a radio device.

Figure 3:
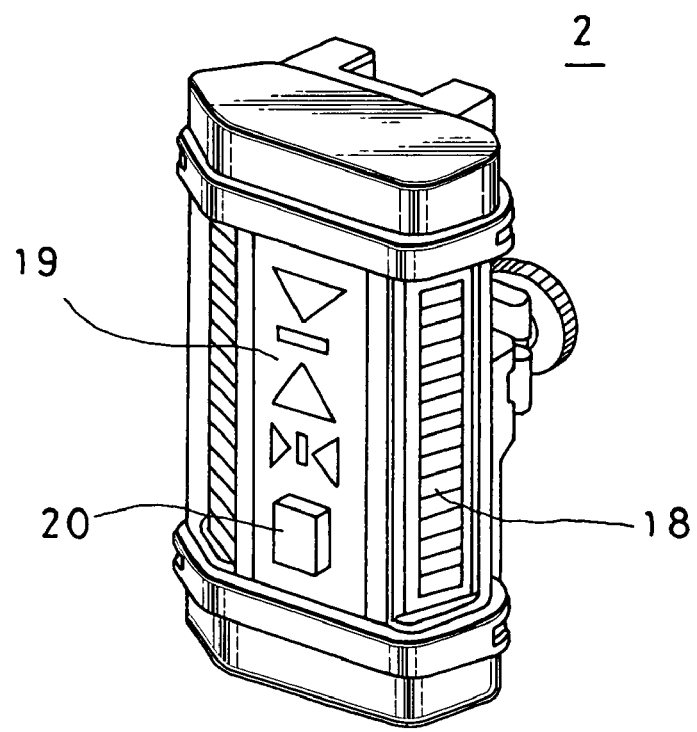
FIG. 3 is a perspective view of an example of a photodetection device used in the invention.

FIG. 3 shows an example of the photodetection device 2. The photodetection device 2 is so designed that the photodetection device 2 is mounted on the mounting pole 7, for instance. The photodetection device 2 comprises a photodetector 18, a display unit 19 for indicating photodetecting condition, and a second communication unit 20 such as a radio device, which mutually communicates with the first communication unit 16. Inside the photodetection device 2, there is provided a control unit, which detects the level of the photodetection light amount and determines light emitting condition of the laser rotary irradiation device 1 based on the results of detection.

Figure 4:
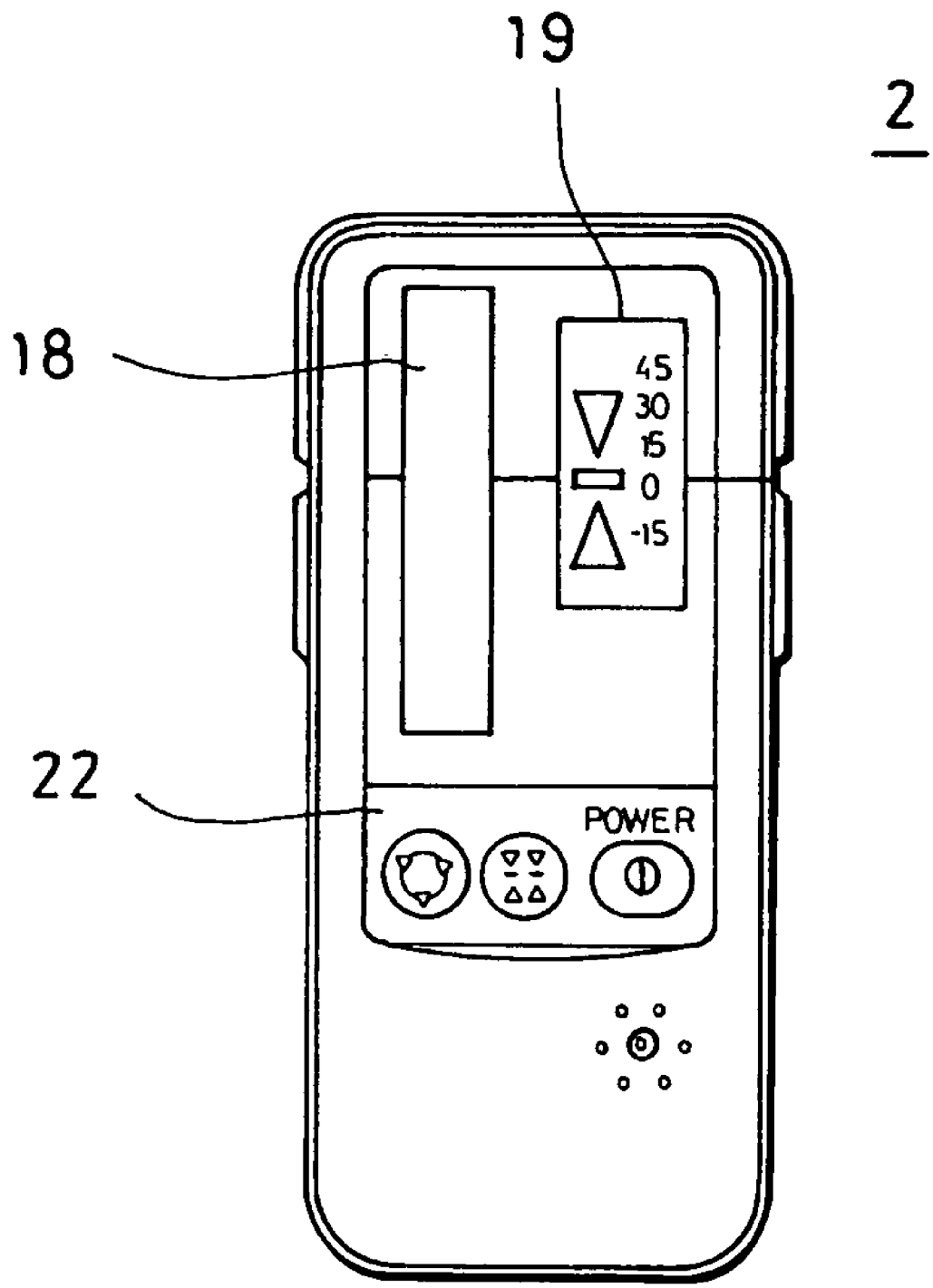
FIG. 4 is a front view of another example of the photodetection device used in the invention.

FIG. 4 represents another example of the photodetection device 2, which is designed as a portable unit. The photodetection device 2 comprises a photodetector 18, a display unit 19, an operation unit 22 and a communication unit (not shown). Similarly to the photodetection device 2 as shown in FIG. 3, there is provided inside the photodetection device 2 a control unit, which detects the level of photodetection light amount and determines light emitting condition of the laser rotary irradiation device 1 based on the result of detection.

Figure 5:
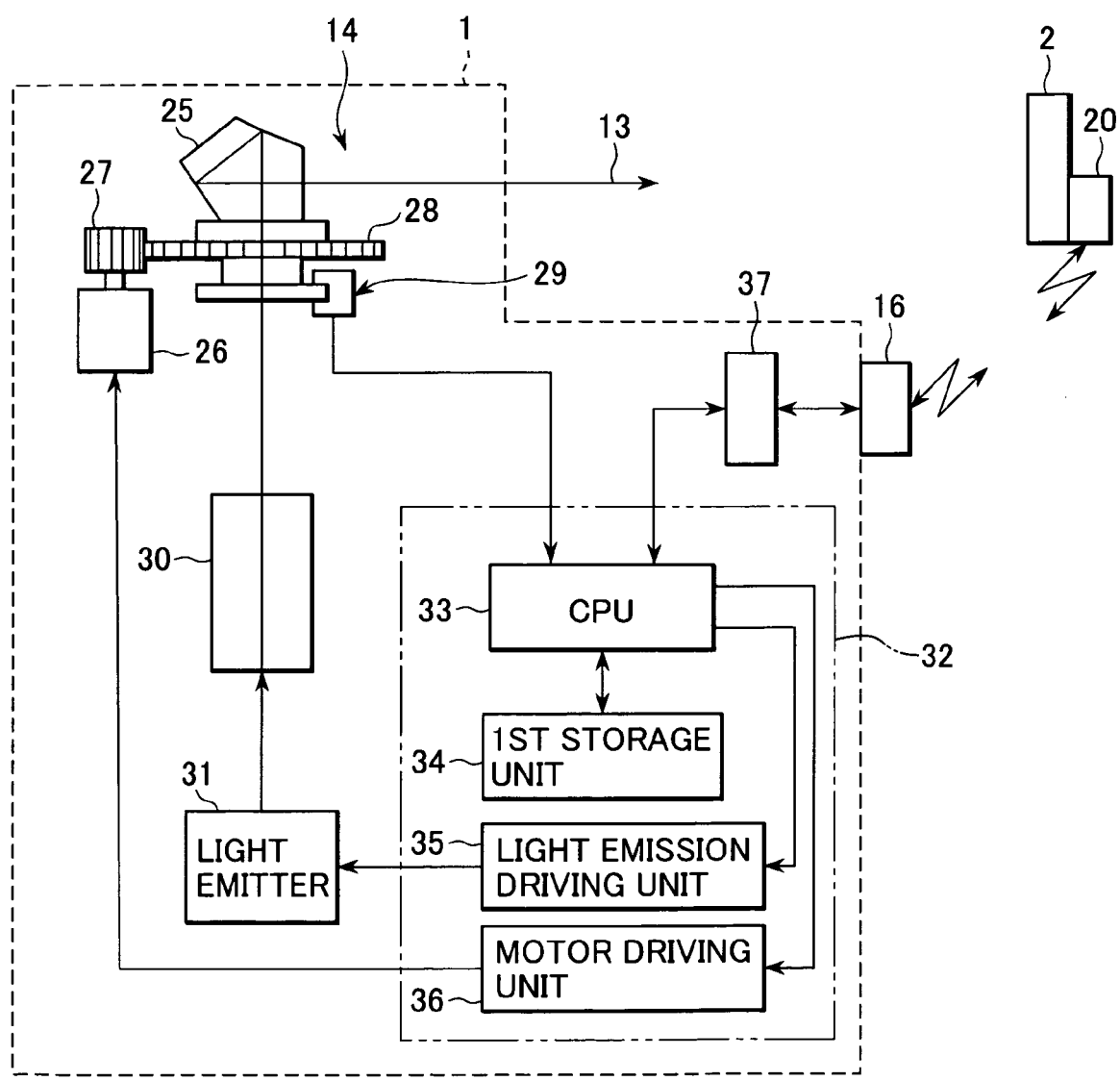
FIG. 5 is a schematical block diagram of a laser rotary irradiation device used in the invention.

Now, referring to FIG. 5, description will be given on approximate arrangement of the laser rotary irradiation device 1.

The rotator 14 has a pentagonal prism 25, which is a deflecting optical member which is rotatably supported, and the pentagonal prism 25 is rotated by a scanning motor 26 via a driving gear 27 and a rotary gear 28. It is so designed that a rotation angle of the pentagonal prism 25 is detected by a rotary encoder 29.

The laser beam 13 emitted from a laser beam emitter 31 enters the pentagonal prism 25 via a projection optical system 30 and is projected after being deflected in a horizontal direction by the pentagonal prism 25.

The driving of the scanning motor 26 and the light emission of the laser beam emitter 31 are controlled by a control unit 32.

The control unit 32 comprises a first arithmetic unit 33, a first storage unit 34, a light emission driving unit 35, and a motor driving unit 36. An angle detection signal from the rotary encoder 29 is inputted to the first arithmetic unit 33, and the scanning motor 26 is controlled to rotate at a predetermined constant speed according to the angle detection signal.

A signal transmitted from the first communication unit 16 or a signal received at the first communication unit 16 is inputted to or outputted from the first arithmetic unit 33 via an input/output control unit 37. For instance, a signal transmitted from the photodetection device 2 is received at the first communication unit 16 and is inputted to the first arithmetic unit 33 via the input/output control unit 37. The result of calculation at the first arithmetic unit 33 and an instruction to the photodetection device 2, etc. are transmitted to the photodetection device 2 by the first communication unit 16 via the input/output control unit 37.

The light emission driving unit 35 drives the laser beam emitter 31 to emit light, and the light emission driving unit 35 also has a function as an emission light amount adjusting means for the laser beam emitted from the laser beam emitter 31. Based on light amount fluctuating instruction from the first arithmetic unit 33, the light emission driving unit 35 controls and adjusts emission light amount from the laser beam emitter 31.

Various types of programs and data are stored in the first storage unit 34. These programs and data include: a control program for driving the scanning motor 26 at a constant speed, a control program for controlling the light amount of the laser beam emitter 31, a setting value necessary for the control, data table, and other data.

Figure 6:
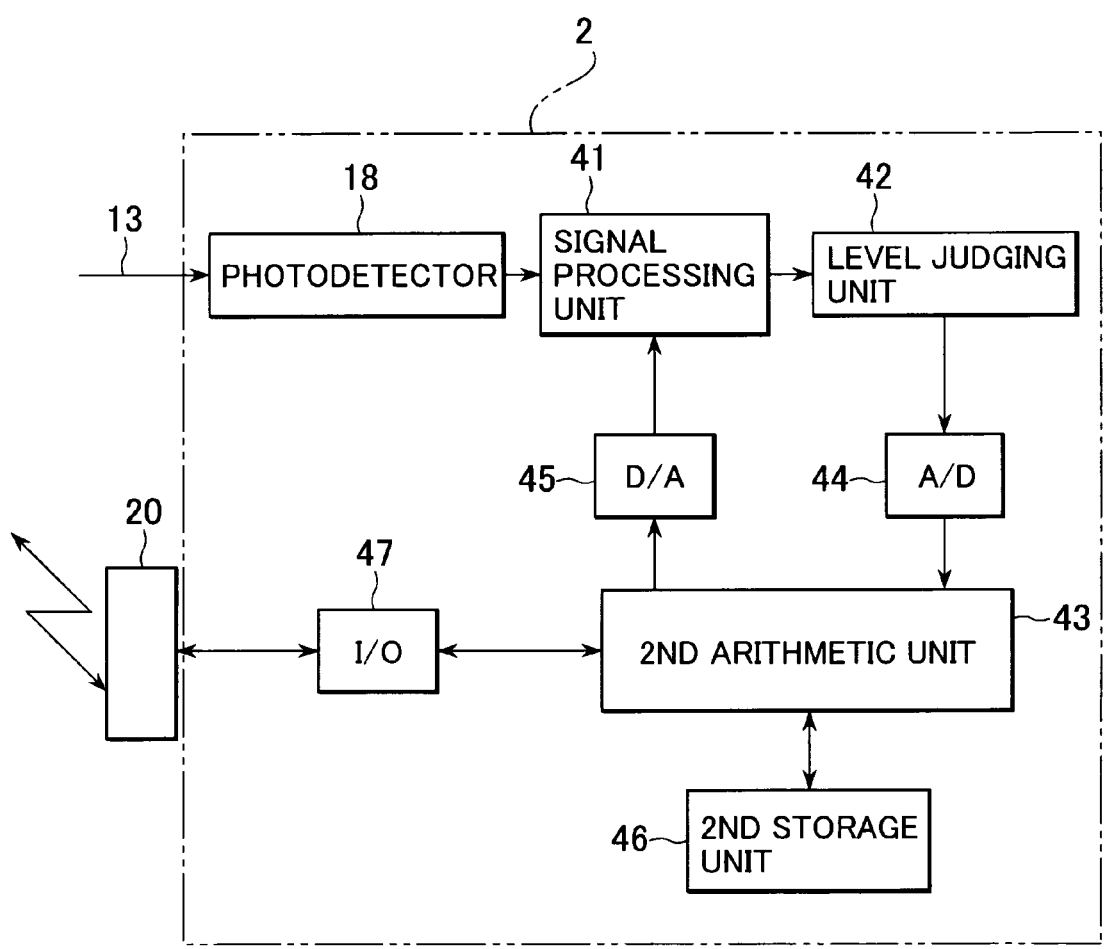
FIG. 6 is a schematical block diagram of a photodetection device used in the invention.

Referring to FIG. 6, description will be given now on the arrangement of the photodetection device 2.

The photodetection device 2 comprises the photodetector 18, a signal processing unit 41, a level judging unit 42, a second arithmetic unit 43, and a second storage unit 46.

When the photodetector 18 receives the laser beam 13, a photodetection signal to correspond to the received light amount is outputted. The signal processing unit 41 performs the processing as necessary such as amplifying on the photodetection signal and determines a peak hold value and outputs the peak hold value to the level judging unit 42.

Figure 7:
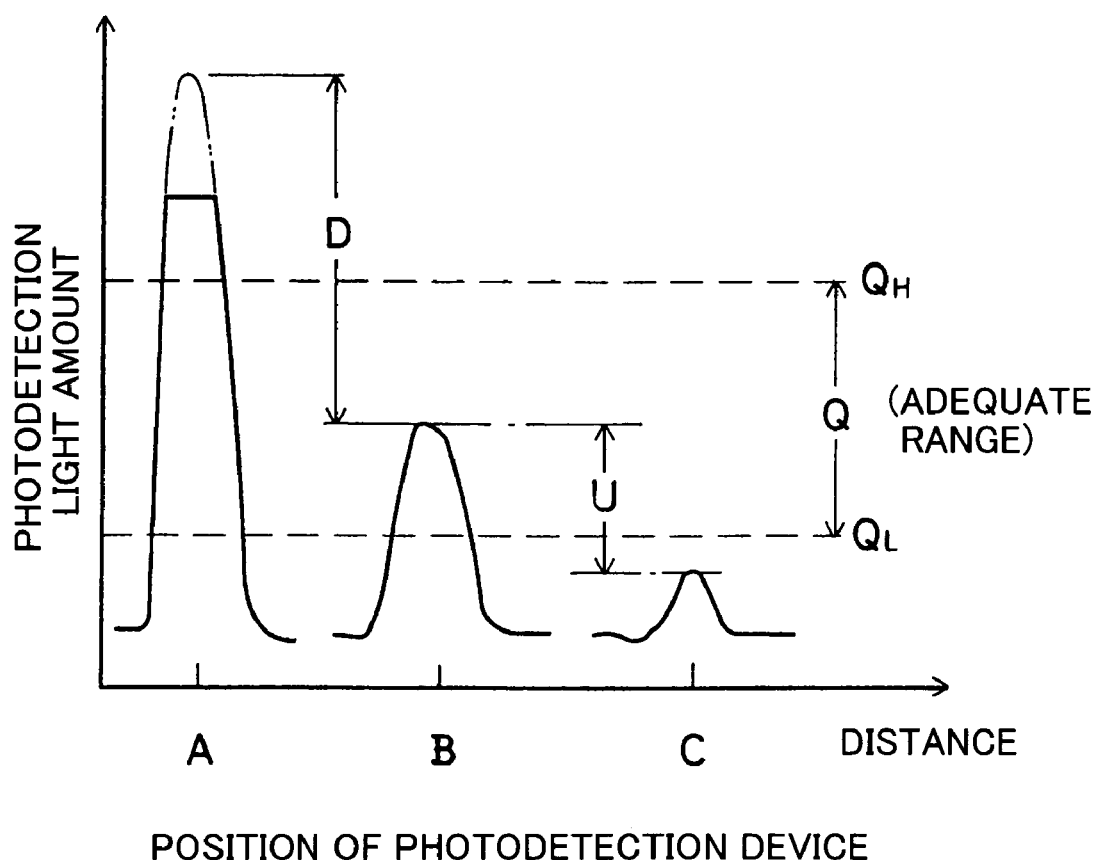
FIG. 7 is a diagram to show the relation between the position of the photodetection device and photodetection light amount (light receiving amount) at a photodetector.

The level judging unit 42 judges whether the peak hold value is within an adequate range Q as shown in FIG. 7 or not. That is, it is judged that the level of the peak hold value is within the range between an upper limit value QH and a lower limit value QL. The signal from the level judging unit 42 is sent to the second arithmetic unit 43 via an A/D converter 44.

Based on the signal from the level judging unit 42, the second arithmetic unit 43 issues an instruction signal. The instruction signal is inputted to the signal processing unit 41 via a D/A converter 45. Based on the instruction signal, a gain in order for amplifying the photodetection signal from the photodetector 18 is adjusted.

Based on the signal from the level judging unit 42, the second arithmetic unit 43 issues another signal for adjusting the light amount. This another instruction signal is sent to the laser rotary irradiation device 1 via a second input/output control unit 47 and the second communication unit 20.

The judging of the level may be performed by the second arithmetic unit 43 instead of the level judging unit 42. In this case, the level judging unit 42 may not be provided.

When the photodetector 18 issues the photodetection signal, the second arithmetic unit 43 transmits an information (i.e. an information that the photodetector 18 is currently in photodetecting condition regardless of whether the photodetection signal is big or small) to the laser rotary irradiation device 1 continuously or at a certain predetermined time interval via the second communication unit 20.

Various types of programs and data are stored in the second storage unit 46. These programs and data include: a program for calculating an adequate light amount of the laser beam 13 based on the signal from the level judging unit 42, a program for calculating an adequate amplification rate (gain) of the signal processing unit 41 to the light amount of the laser beam 13, and further, the data necessary for calculating the adequate light amount, the data necessary for calculation of the adequate gain, etc.

FIG. 7 shows the photodetection light amount when the laser rotary irradiation device 1 projects the laser beam 13 in rotary irradiation with a predetermined light amount. FIG. 7 shows the cases where the photodetection device 2 is at a short distance position A with respect to the laser rotary irradiation device 1, at an adequate position B, and at a long distance position C. When the photodetection device 2 is at the short distance position A, the light amount is too high, and the photodetection signal is saturated. At the adequate position B, the photodetection device 2 issues an adequate signal. At the long distance position C, the output value is too low.

In the case, where the result of the judgment from the level judging unit 42 has the condition as shown in A, the second arithmetic unit 43 calculates a light amount, at which the value of the photodetection signal is decreased by an amount of D, for instance. The result of the calculation is sent to the laser rotary irradiation device 1 via the second communication unit 20. In the case the peak hold value is saturated, the value of D cannot be obtained directly, and the procedures of Step 06, Step 07, and Step 08 are repeated (See FIG. 8).

In the case where the result of the judgment from the level judging unit 42 has the condition as shown in C, the second arithmetic unit 43 calculates the gain so that the value that the value of photodetection signal will be increased by an amount of U, for instance. Based on the result of calculation, the gain of the signal processing unit 41 is changed.

Figure 8:
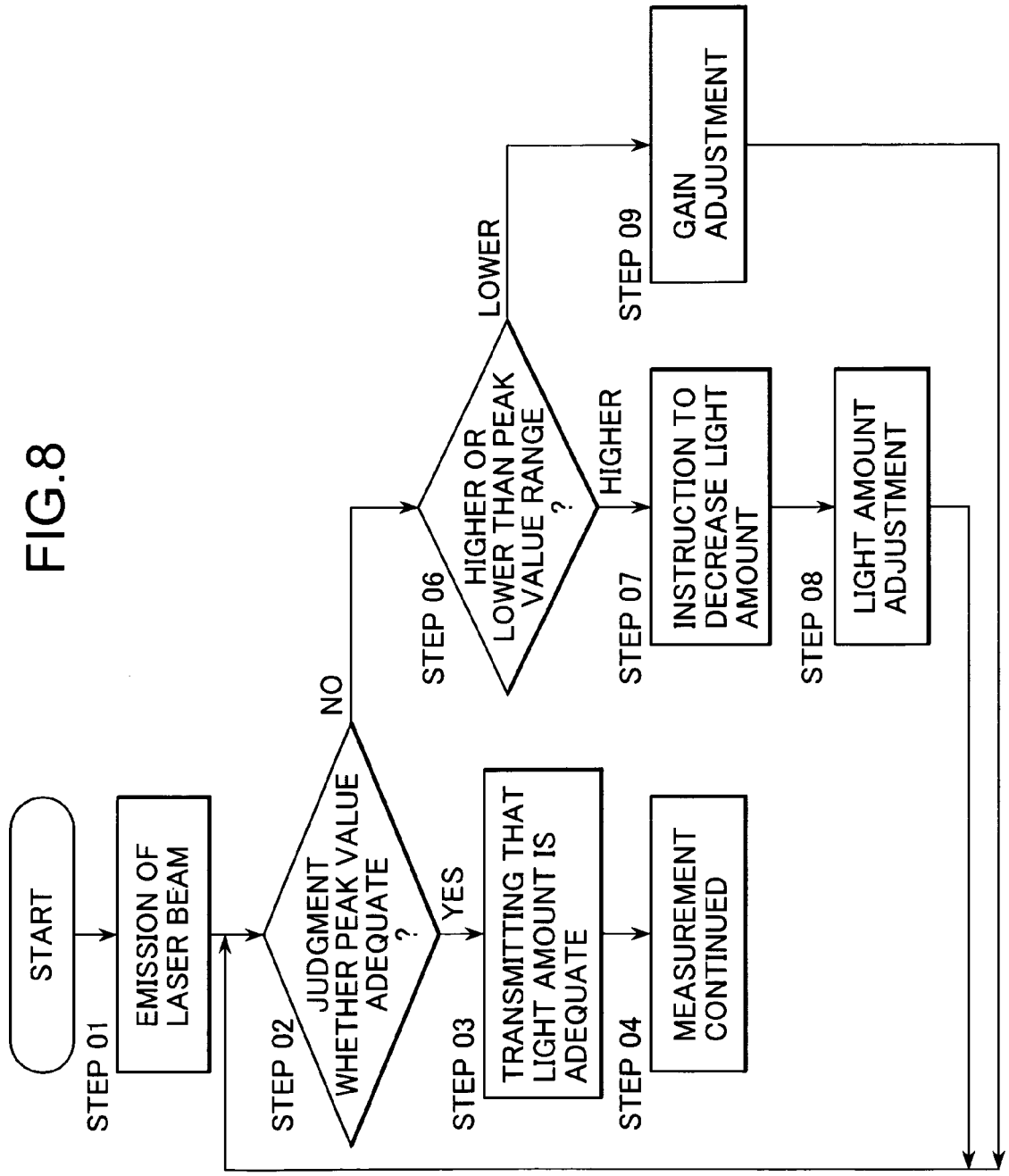
FIG. 8 is a flow chart of a first aspect of the invention.

Next, referring to FIG. 8, description will be given on the flow of operation of the laser measuring system.

When surveying operation is started, the laser rotary irradiation device 1 projects the laser beam with light amount of an initial setting value in rotary irradiation (Step 01). The initial setting value of the light amount is set to such a value, for instance, that measurement can be made at the most distant position as guaranteed by the laser rotary irradiation device 1 (i.e. the highest light amount).

The laser beam 13 is received at the photodetection device 2. The photodetector 18 issues a photodetection signal. The peak hold value is detected by the signal processing unit 41 and the peak hold value is outputted to the level judging unit 42. At the level judging unit 42, it is judged whether the peak hold value is adequate or not (Step 02). If the value is adequate, the second arithmetic unit 43 issues an adequate signal, indicating that the light amount of the laser beam is adequate, to the laser rotary irradiation device 1 via the second communication unit 20 (Step 03).

The laser rotary irradiation device 1 receives the adequate signal via the first communication unit 16. Based on the adequate signal, the first arithmetic unit 33 performs control so that the light emitting condition of the laser beam emitter 31 is maintained at the present status (Step 04).

If it is judged in the level judgment of the peak hold value that the peak hold value is not within the adequate range, it is judged further whether the peak hold value is higher than the upper limit value QH or lower than the lower limit value QL (Step 06).

If it is judged as higher, it is calculated at the second arithmetic unit 43 as to how far the photodetection light amount should be reduced to decrease the peak hold value by an amount of D (see FIG. 7). Based on the calculation result, a light amount decreasing signal is sent to the laser rotary irradiation device 1 via the second communication unit 20 (Step 07).

The laser rotary irradiation device 1 receives the light amount decreasing signal via the first communication unit 16. Based on the light amount decreasing signal, the first arithmetic unit 33 controls the light emission driving unit 35 so that the emitted light amount from the laser beam emitter 31 corresponds to the light amount decreasing instruction and decreases the emitted light amount of the laser beam emitter 31 (Step 08).

Going back to Step 02, it is judged whether the decrease of the light amount is adequate or not. If the decrease of the light amount is adequate, the measurement is continued.

In case it is judged in Step 06 that the peak hold value is lower than the lower limit QL, it is calculated at the second arithmetic unit 43 as to how far the gain at the signal processing unit 41 should be increased. The amount of the gain to increase the peak hold value by an amount of U is calculated. Based on the result of calculation, a gain adjustment instruction is outputted to the signal processing unit 41. Then, the gain of the signal processing unit 41 is adjusted so that the peak hold value will be within the adequate range (Step 09).

As the result of the gain adjustment, it is judged whether the peak hold value is within the adequate range or not in Step 02. If it is in the adequate range, the measurement operation is continued.

Next, when the level measurement (reference position measurement) is not performed by the photodetection device 2, no signal is issued from the photodetection device 2 to indicate that the photodetection device 2 is in photodetecting condition. In the case the signal from the photodetection device 2 to indicate that the photodetection device 2 is in photodetecting condition is not received within a certain predetermined period of time, e.g. within 30 minutes, the laser rotary irradiation device 1 judges that the measurement operation is currently suspended. As a result, the first arithmetic unit 33 controls the light emission driving unit 35 and decreases the emission light amount of the laser beam emitter 31 to the lowest light amount or the like.

When the signal to indicate that the photodetection device 2 is in photodetecting condition is not received further for a certain predetermined period of time, e.g. for one hour, it is judged that the measurement operation has been terminated, and the power source to the laser rotary irradiation device 1 is turned off.

When measurement operation is started, the operation unit 15 of the laser rotary irradiation device 1 is operated, or an instruction to resume the measurement is transmitted to the laser rotary irradiation device 1 from the operation unit 22 of the photodetection device 2.

The judgment on the suspension of the level measurement operation may be made at the photodetection device 2. That is, when such condition continues that the laser beam is not received from a certain period of time at the photodetector 18, the photodetection device 2 itself judges that the operation is in the state of suspension, and a suspension signal to indicate that the operation is in the suspension state is transmitted to the laser rotary irradiation device 1 via the second communication unit 20. When the suspension signal is received, the laser rotary irradiation device 1 decreases the emission light amount of the laser beam emitter 31 to the lowest light amount or the like. When the suspension state of the level measuring operation is judged at the photodetection device 2 side, the issuing of the signal from the photodetection device 2 to indicate that the photodetection device 2 is in photodetecting condition may be omitted.

When judgment is made on the suspension state of the level measurement operation at the photodetection device 2, and if the suspension state continues further for a certain period of time, the power source to the laser rotary irradiation device 1 is turned off. When the measurement operation is started, the operation unit 15 of the laser rotary irradiation device 1 is operated or an instruction to resume the measurement is sent to the laser rotary irradiation device 1 from the operation unit 22 of the photodetection device 2.

The instruction to start or terminate the measurement operation is given from the operation unit 15 of the laser rotary irradiation device 1 or from the operation unit 22 of the photodetection device 2.

It may be designed in such manner that, when the level measuring operation is suspended, the laser emission light amount is increased after the elapse of a predetermined period of time or once in a predetermined time cycle, e.g. only one turn during the period when the laser beam of the rotary irradiation device 1 is rotated by 10 turns. The operation may be resumed from the suspension state if a receiving signal is obtained. In this case, the laser light amount may be increased to the value of the light amount immediately before the suspension of operation or may be set to the highest light amount. As a result, in the case the photodetection signal from the photodetection device is not received due to the suspension or the termination of the operation or the other causes, it is possible to resume the operation by increasing the emission light amount while suppressing the power consumption to lower level.

By decreasing the light amount of the laser beam or by stopping the laser rotary irradiation device 1 through the judgment on the suspension of the level measuring operation, it is possible to prevent omission of turning-off of the power source to the laser rotary irradiation device 1 due to the termination of operation or to the suspension of operation for long time, and this is helpful to avoid useless power consumption.

It is suffice that the adequate range Q as shown in FIG. 7 may have such an extent to cover the variation of the peak hold value of the photodetection signal which is output when the photodetector 18 receives the laser beam 13 with a constant light amount. The upper limit QH can be set to such a low value that it may not interfere with the measurement operation.

In the measurement for short distance, the emission light amount is decreased, and this contributes to the saving of power.

In the power consumption at the laser rotary irradiation device 1, power consumption by laser beam emission occupies 40% to 50% in case the light amount is at the highest. Under normal operating condition, the laser measuring system is generally used at a shorter distance than the range as guaranteed by the laser measuring system. For instance, even in the case of a laser measuring system, for which measurement is guaranteed for a range of 500 m in radius, operation is mostly performed actually for a range of less than 200 m in radius. Thus, it is very effective to save power by decreasing the light amount of the laser beam to a value to match the range of short distance.

Next, referring to FIG. 9, description will be given on a case where gain adjusting function in the signal processing unit 41 is omitted, and a case where the laser beam emitter 31 has ample allowance in the increase or the decrease of light amount or the emission light amount when the measurement is started is not at the highest and the laser beam emitter 31 is set to have some allowance for the increase of the light amount. The flow of operation up to Step 06 is similar to the procedure explained in connection with FIG. 8, and detailed description is not given here.

In the case it is judged in Step 06 that the peak hold value is lower than the lower limit QL, it is calculated at the second arithmetic unit 43 as to how far the photodetection light amount should be increased in order to increase the peak hold value by an amount of U (see FIG. 7). Based on the result of calculation, a light amount increasing instruction is transmitted to the laser rotary irradiation device 1 via the second communication unit 20 (Step 11).

The laser rotary irradiation device 1 receives the light amount increasing instruction via the first communication unit 16. Based on the light amount increasing instruction, the first arithmetic unit 33 controls the light emission driving unit 35 so that the emission light amount of the laser beam emitter 31 corresponds to the light amount increasing instruction and increases the emission light amount of the laser beam emitter 31 (Step 12).

When the projection of the laser beam in rotary irradiation by the laser rotary irradiation device 1 is started and the photodetection signal is not outputted from the photodetector 18 within a certain predetermined period of time, e.g. within about 10 seconds, an instruction to increase the light amount of the laser beam 13 is issued to the laser rotary irradiation device 1.

Now, referring to FIG. 10, description will be given on a case where the signal processing unit 41 has gain adjusting function, and a case where the laser beam emitter 31 has ample allowance in the increase or the decrease of light amount or the emission light amount when the measurement is started is not at the highest and the laser beam emitter 31 is set to have ample allowance with respect to the increase of light amount. The flow of operation up to Step 06 is similar to the procedure described in connection with FIG. 8, and detailed description is not given here.

In the case the peak hold value is judged as lower than the lower limit QL in Step 06, it is confirmed to the laser rotary irradiation device 1 whether the light amount can be increased or not via the second communication unit 20 and the first communication unit 16 (Step 21).

If it is possible to increase the light amount, it is calculated at the second arithmetic unit 43 as to how far the emission light amount should be increased for the purpose of increasing the peak hold value by an amount of U (see FIG. 7). Based on the calculation result, an instruction to increase the light amount is issued to the laser rotary irradiation device 1 via the second communication unit 20 (Step 22).

The laser rotary irradiation device 1 receives the light amount increasing instruction via the first communication unit 16. Based on the light amount increasing instruction, the first arithmetic unit 33 controls the light emission driving unit 35 so that the emission light amount of the laser beam emitter 31 corresponds to the light amount increasing instruction and increases the emission light amount of the laser beam emitter 31 (Step 23).

In the case it is judged that the light amount cannot be increased in Step 21, the amount of gain is calculated at the second arithmetic unit 43 to increase the peak value by an amount of U. Based on the result of calculation, a gain adjusting instruction is output to the signal processing unit 41. Then, the gain at the signal processing unit 41 is adjusted so that the peak hold value is turned to the adequate range (Step 24).

It is controlled in such manner that the peak hold value is to be within the adequate range by giving priority to the light amount adjustment of the laser beam 13. As a result, it is possible to give optimal light amount without causing waste of power for the measurement. As a result, power can be saved. Also, the burden by the gain adjustment on the signal processing unit 41 can be reduced. This makes it possible to simplify the circuit configuration and to reduce the cost.

The laser emission light amount may be controlled linearly or non-linearly. For instance, control can be made in such manner as to match the amount of the deviation from the adequate light amount. In this case, if the light amount is extensively deviated from the adequate light amount, the light amount can be increased or decreased by a large amount. If the light amount is closer to the adequate light amount, the light amount can be gradually increased or decreased. As a result, the emission light amount can be quickly set within the adequate light amount range and useless power consumption can be avoided.

By providing a plurality of the upper limit values QH and the lower limit values QL and also by setting a narrower light amount range within the adequate light amount range Q, it is possible to obtain the adequate emission light amount regardless of the operation distance, and this makes it possible to increase the efficiency to reduce power consumption. By setting a target light amount value within the adequate light amount range, the emission light amount may be controlled so that the target light amount value can be attained at all times.

What is claimed is:

1. A laser measuring system, comprising a laser rotary irradiation device for forming a laser reference plane by projecting a laser beam in rotary irradiation, and a photodetection device for performing position measurement by receiving the laser beam, wherein said laser rotary irradiation device comprises a laser beam emitter, an emission light amount adjusting means for adjusting light amount of the laser beam of said laser beam emitter, and a first communication means for performing communication with said photodetection device, wherein said photodetection device comprises a photodetector for detecting the reference plane, a second communication means for performing communication to and from said laser rotary irradiation device, and a control unit for calculating whether a photodetection signal from said photodetector is within a predetermined range or not, wherein said first communication means transmits a laser beam emitting condition of said laser rotary irradiation device to said second communication means, and said second communication means transmits a photodetecting condition of said photodetection device to said first communication means, and wherein said control unit transmits the calculation result to said laser rotary irradiation device via said second communication means, said emission light amount adjusting means adjust the light amount of the laser beam based on the calculation result received so that a peak value of the photodetection signal will be within a predetermined range.

2. A laser measuring system according to claim 1, wherein said control unit adjusts amplifying condition of the photodetection signal from said photodetector based on the calculation result so that the photodetection signal will be within a predetermined range.

3. A laser measuring system according to claim 1, wherein said control unit adjusts the amplifying condition of the photodetection signal from said photodetector based on the calculation result, and the photodetection signal is turned to a predetermined range by adjusting the light amount and the amplifying condition.

4. A laser measuring system according to claim 1, wherein said emission light amount adjusting means increases the emission light amount of the laser beam in the case said first communication means does not receive a signal to indicate photodetecting condition from said photodetection device for a first predetermined period of time.

5. A laser measuring system according to claim 1, wherein said emission light amount adjusting means decreases the emission light amount of the laser beam in the case said first communication means does not receive a signal to indicate the photodetecting condition from said photodetection device for a second predetermined period of time.

6. A laser measuring system according to claim 1, wherein said photodetection device issues a signal to decrease the light amount to said laser rotary irradiation device, and said emission light amount adjusting means decreases the emission light amount of the laser beam, in the case the photodetector does not receive light for a second predetermined period of time.

7. A laser measuring system according to claim 5 or claim 6, wherein said emission light amount adjusting means further increases the emission light amount of the laser beam temporarily after the elapse of a certain predetermined period of time from the time when the emission light of the laser beam has been decreased.

8. A laser measuring system according to claim 1 or claim 6, wherein, in the case said photodetection device does not receive the light for a second predetermined period of time, it is judged that level measuring operation is in suspension status.

9. A laser measuring system according to claim 8, wherein judgment of the suspension status is given by said laser rotary irradiation device.

10. A laser measuring system according to claim 8, where judgment of the suspension status is given by said photodetection device.

11. A laser measuring system according to claim 6, wherein, in the case said photodetection device does not receive light for a third predetermined period of time longer than the second predetermined period of time, it is judged that level measuring operation has been terminated.

12. A laser measuring system according to claim 11, wherein judgment of the termination of the operation is made by said laser rotary irradiation device.

13. A laser measuring system according to claim 11, wherein judgment of the termination of the operation is made by said photodetection device.

* * * * *